(12) United States Patent
Chun et al.

(10) Patent No.: US 12,405,380 B2
(45) Date of Patent: Sep. 2, 2025

(54) METHOD FOR DETECTING GROUND USING LIDAR SENSOR AND GROUND DETECTION DEVICE PERFORMING SAME

(71) Applicant: Vueron Technology Co., Ltd, Seoul (KR)

(72) Inventors: Changhwan Chun, Seoul (KR); Seungyong Lee, Goyang-si (KR)

(73) Assignee: Vueron Technology Co., Ltd, Seoul (KR)

( * ) Notice: Subject to any disclaimer, the term of this patent is extended or adjusted under 35 U.S.C. 154(b) by 1038 days.

(21) Appl. No.: 17/462,331

(22) Filed: Aug. 31, 2021

(65) Prior Publication Data
US 2022/0413147 A1    Dec. 29, 2022

(30) Foreign Application Priority Data
Jun. 23, 2021 (KR) .................. 10-2021-0081715

(51) Int. Cl.
*G01S 17/89* (2020.01)
*G01S 17/931* (2020.01)

(52) U.S. Cl.
CPC ............ *G01S 17/89* (2013.01); *G01S 17/931* (2020.01)

(58) Field of Classification Search
CPC .................................. G01S 1/89; G01S 1/931
See application file for complete search history.

(56) References Cited

U.S. PATENT DOCUMENTS

| 10,705,220 | B2* | 7/2020 | Kim | G06T 7/11 |
| 2017/0356993 | A1* | 12/2017 | Lee | G01S 13/93 |
| 2018/0059666 | A1* | 3/2018 | Izzat | G01S 17/931 |
| 2020/0191972 | A1* | 6/2020 | Zhao | G01S 17/931 |
| 2020/0219264 | A1* | 7/2020 | Brunner | G01S 7/4808 |
| 2023/0050013 | A1* | 2/2023 | Sung | G01S 17/89 |
| 2023/0176218 | A1* | 6/2023 | Zeng | H04N 23/90 |

OTHER PUBLICATIONS

A.S. Abdul Rachman., "3D-LIDAR Multi Object Tracking for Autonomous Driving"; Degree of Master (Delft university of Technology); Nov. 9, 2017; 140 pages.

* cited by examiner

*Primary Examiner* — Tan Q Nguyen
(74) *Attorney, Agent, or Firm* — Bridgeway IP Law Group, PLLC; Jihun Kim

(57) ABSTRACT

A method of detecting a ground that is performed by a ground detection device is provided. The method includes arranging points obtained from a lidar sensor in a plurality of cells included in a circular grid map, generating a profile value for each of the plurality of cells using heights of the points; and detecting around points arranged in each of the plurality of cells using the profile values.

17 Claims, 9 Drawing Sheets

METHOD FOR DETECTING GROUND USING LIDAR SENSOR AND GROUND DETECTION DEVICE PERFORMING SAME

CROSS-REFERENCE TO RELATED APPLICATION

This application claims priority to Korean Patent Application No. 10-2021-0081715, filed on Jun. 23, 2021. The entire contents of the application on which the priority is based are incorporated herein by reference.

TECHNICAL FIELD

The present disclosure relates to a method for detecting a ground (ground surface) using a light detection and ranging (LiDAR) sensor and a ground detection device for performing the method.

BACKGROUND

A lidar sensor is a popular sensor used in various industrial fields (autonomous driving, security, safety, harbors, etc.). When point information obtained by the lidar sensor having high accuracy is used, the lidar sensor can be applied to various fields and combined therewith.

The lidar sensor provides a point cloud having a plurality of pieces of data. To effectively process the point cloud, object detection is important. Here, object detection indicates grouping points in units of an obstacle or an object to represent the obstacle or the object.

To effectively perform such object detection in autonomous driving, it is necessary to accurately detect points reflected (backscattered) from a ground (ground surface) because obstacle detection, map building and subsequent processes can be smoothly performed upon accurate detection of the ground.

In addition, it is very important that ground points on the ground (ground surface scanning points) are not perceived as obstacles in the autonomous driving. Through the accurate ground detection, it is possible to detect an area having no obstacle in which a vehicle can travel and to provide area information that can be used to detect lane edges and road signs.

<Problems in Lidar Processing Technologies>

Point data of a lidar sensor includes a large number of points and thus it is difficult to process the point data. Further, when all points are accessed and clustering and ground detection are performed, a considerably long processing time is required and thus there are many restrictions on actual application.

The ground of a road may have various curves depending on directions and locations. Further, various grounds such as an entrance to an overpass and an entrance to an underpass may exist. Accordingly, it is also important to effectively detect the ground in such various ground environments.

In addition, lidar sensors have various types, various scanning methods, and various types of information. Accordingly, a method performed in a certain sensor may not be performed in other sensors. The number of such various sensor conditions will increase as lidar sensors are popularized. Thus, there is a demand for a technology for accurately detecting the ground using only point cloud data irrespective of a scan structure of a lidar sensor for an algorithm that can operate in such various lidar sensors.

SUMMARY

In view of the above, the present disclosure provides a method for detecting a ground using a lidar sensor.

However, the problem to be solved by the present disclosure is not limited thereto, and may be variously expanded in an environment within a range not departing from the idea and the scope of the present disclosure.

In accordance with an aspect of the present disclosure, there is provided a method for detecting a ground that is performed by a ground detection device, the method including: arranging points obtained from a lidar sensor in a plurality of cells included in a circular grid map; generating a profile value for of the plurality of cells using heights of the points; and detecting ground points arranged in each of the plurality of cells using the profile values.

Further, the generating of the profile value for each of the plurality of cells may include determining one or more candidate ground cells among the plurality of cells using the heights of the points; and generating the profile value for each of the plurality of cells using heights of points arranged in the one or more candidate ground cells.

Further, the determining of the one or more candidate ground cells may include comparing a height difference between a first point having the greatest height and a second point having the smallest height among the points arranged in each of the plurality of cells with a predetermined value; and determining the one or more candidate ground cells based on a result of the comparison.

Further, the generating of the profile value for each of the plurality of cells may include extracting candidate ground cells having the same angular component from the one or more candidate ground cells; among the candidate ground cells having the same angular component, determining a first candidate ground cell as a valid ground cell when a height difference between a first point having the smallest height arranged in the first candidate ground cell and a second point having the smallest height arranged in a second candidate ground cell positioned before the first candidate ground cell in a rho-direction of the circular grid map is less than a predetermined value; and generating one or more valid ground cells as a result of the determining.

Further, the generating of the profile value for each of the plurality of cells further may include generating a line fitting function for valid ground cells having the same angular component using heights of points arranged in the one or more valid ground cells having the same angular component among the determined one or more valid ground cells.

Further, the line fitting function may represent a height per each radius component of the circular grid map.

Further, the generating of the profile value for each of the plurality of cells may further include generating a first profile value of a first cell among the plurality of cells using the line fitting function; and determining, as a final profile value of the first cell, an average of second profile values of N number of second cells that are adjacent to the first cell and have the same radius component as that of the first cell where N is an integer equal to or greater than 1.

Further, the determining of the final profile value of the first cell may include determining the average of the second profile values after excluding a third cell having a profile value different from the first profile value by a predetermined reference value or more among the N number of second cells.

Further, the detecting of the ground points may include detecting points having heights within a predetermined range from the final profile value among points arranged in the first cell as the ground points.

In accordance with another aspect of the present disclosure, there is provided a ground detection system, including: a lidar sensor to obtain point data therearound; and a ground detection device for detecting a ground that includes: a transceiver to obtain, from a lidar sensor, point data around the lidar sensor; and a processor to control the transceiver, the processor being configured: to arrange the point data in a plurality of cells included in a circular grid map; to determine one or more candidate ground cells among the plurality of cells using heights of points arranged in the plurality of cells; to generate a profile value for each of the plurality of cells using height of points arranged in the one or more candidate ground cell; and to detect ground points arranged in each of the plurality of cells using the profile value.

In accordance with still another aspect of the present disclosure, there is provided a non-transitory computer-readable storage medium storing computer-executable instructions which cause, when executed by a processor, the processor to perform a method for detecting a ground that is performed by a ground detection device, the method including: arranging points obtained from a lidar sensor in a plurality of cells included in a circular grid map; generating a profile value for each of the plurality of cells using heights of the points; and detecting ground points arranged in each of the plurality of cells using the profile values.

According to the aspects of the present disclosure, it is possible to detect a ground rapidly and efficiently by dividing a circular grid map into a plurality of cells and detecting the ground of a road.

Furthermore, according to the aspects of the present disclosure, it is possible to accurately detect various curves, entrances to and exits from overpasses, and entrances to and exits from underpasses on roads by performing ground profiling in a rho-direction and performing profile filtering in a theta-direction.

Moreover, according to the aspects of the present disclosure, it is possible to detect the ground of a road irrespective of a lidar sensor type by detecting the ground using a plurality of cells obtained by dividing the circular grid map, improving system applicability.

DETAILED DESCRIPTION OF THE EMBODIMENTS

The advantages and features of exemplary embodiments of the present disclosure and methods of accomplishing them will be clearly understood from the following description of the embodiments taken in conjunction with the accompanying drawings. However, the present disclosure is not limited to those embodiments and is implemented in various forms. It is noted that the embodiments are provided to make a full disclosure and also to allow those skilled in the art to know the full scope of the present disclosure.

In the following description, well-known functions and/or configurations will not be described in detail if they would unnecessarily obscure the features of the disclosure. Further, the terms to be described below are defined in consideration of their functions in the embodiments of the disclosure and vary depending on a user's or operator's intention or practice. Accordingly, the definition is made on a basis of the content throughout the present disclosure.

Figure 1:
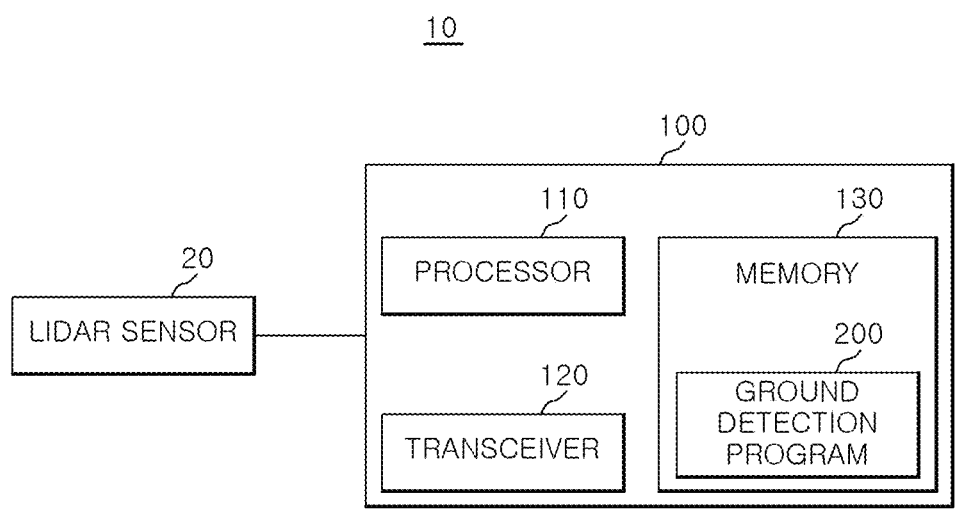
FIG. 1 is a block diagram illustrating a ground detection system according to an embodiment of the present disclosure.

FIG. 1 is a block diagram illustrating a ground detection system according to an embodiment of the present disclosure.

Referring to FIG. 1, a ground detection system 10 may include a lidar sensor 20 and a ground detection device 100.

In the present disclosure, for the sake of convenience of description, a case where the ground detection system 10 is installed in a driving vehicle with which one or more lidar sensors are equipped (hereinafter simply referred to as a vehicle) is mainly described. However, the present disclosure is not limited thereto and, for example, the ground detection system 10 may be installed in an unmanned moving object such as a drone or other moving objects such as a vehicle, a motorcycle, a flight vehicle, and the like as well as the driving vehicle with the lidar sensors such as an autonomous vehicle.

In addition, in the present disclosure, a case where the lidar sensor 20 is provided separately from the ground detection device 100 to transmit point data to the ground detection device 100 is mainly described. However, the present disclosure is not limited thereto. For example, the ground detection device 100 may include the lidar sensor 20. In this case, the lidar sensor 20 may transmit the point data to a grid map generator 210 which will be described later through internal signaling.

The lidar sensor 20 may emit a laser beam (light pulse) in a predetermined direction, for example, in all direction (360 degrees) including not only a direction in which the driving vehicle with the ground detection device 100 moves (forward direction) but also lateral and backward directions of the driving vehicle with the ground detection device 100. The lidar sensor 20 may receive a reflected (or backscattered) laser beam from surrounding terrain and objects and collect point data through the reflected laser beam. Here, point data collected by the lidar sensor 20 may be a point cloud including one or more points.

The ground detection device 100 may receive point data from the lidar sensor 20 and detect a ground (ground surface) around the ground detection device 100 (or the driving vehicle with the ground detection device 100) using the received point data.

Specifically, the ground detection device 100 may generate a circular grid map that is divided into a plurality of cells and arrange a plurality of points of the received point data in the plurality of cells. Then, the ground detection device 100 may generate profile data generated for each of the cells to detect ground points (ground surface scanning points) included in the corresponding cell.

In one embodiment, when the circular grid map is divided into the plurality of cells, the ground detection device 100 may set a cell size (e.g., a magnitude of a radius component and a magnitude of an angular component) to a physically significant numerical value. That is, the ground detection device 100 uses profile data that are determined using cells each having a physically significant numerical value to detect a ground. Thus, the ground detection device 100 may detect the ground irrespective of the type of the lidar sensor 20 (i.e., irrespective of a point input pattern).

In this connection, the ground detection device 100 may include a processor 110, a transceiver 120, and a memory 130.

The processor 110 may control the overall operation of the ground detection device 100.

The processor 110 may receive the point data from the lidar sensor 20 through the transceiver 120.

In the present disclosure, a case where the ground detection device 100 receives the point data through the transceiver 120 is mainly described. However, the present disclosure is not limited thereto and, for example, the ground detection device 100 may include an input/output device (not shown) and receive the point data through the input/output device. Alternatively, for example, the ground detection device 100 may include the lidar sensor 20 to generate the point data in the ground detection device 100.

The memory 130 may store a ground detection program 200 and information necessary to execute the ground detection program 200.

In the present disclosure, the ground detection program 200 may be software including instructions that are programmed to detect the ground on a road by using information of the point data.

The processor 110 may load the ground detection program 200 and the information necessary to execute the ground detection program 200 from the memory 130.

Further, the processor 110 may execute the ground detection program 200 to detect the ground on a road using the received point data.

Functions and/or an operation of the ground detection program 200 will be described in detail with reference to FIG. 2.

Figure 2:
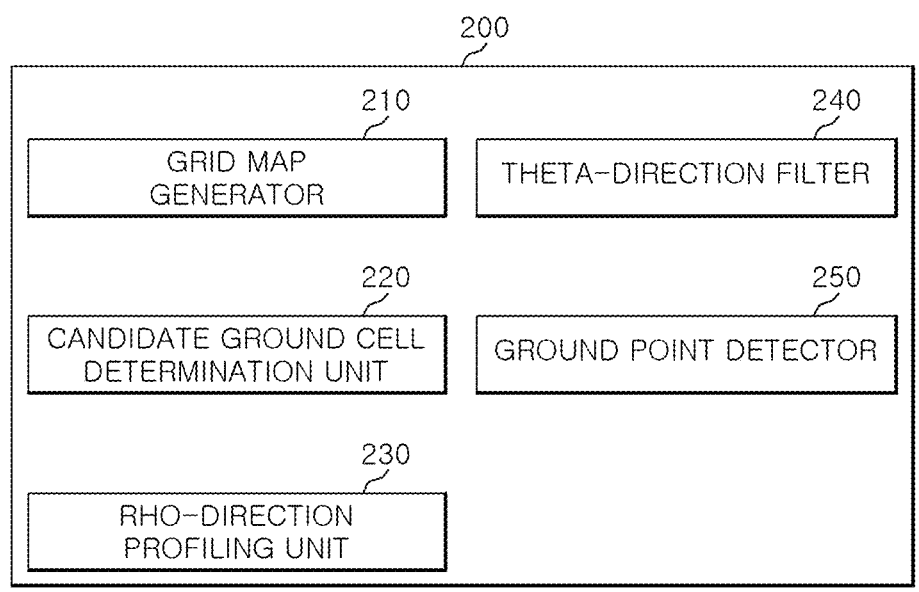
FIG. 2 is a block diagram conceptually illustrating an example of functions of a ground detection program according to the embodiment of the present disclosure.

FIG. 2 is a block diagram conceptually illustrating an example of the functions of the ground detection program 200 according to the embodiment of the present disclosure.

Referring to FIGS. 1 and 2, the ground detection program 200 may include the grid map generator 210, a candidate ground cell determination unit 220, a rho-direction profiling unit 230, a theta-direction filter 240, and a ground point detector 250.

In FIG. 2, the ground detection program 200 is conceptually divided into the grid map generator 210, the candidate ground cell determination unit 220, the rho-direction profiling unit 230, the theta-direction filter 240, and the ground point detector 250 in order to easily explain the functions of the ground detection program 200. However, the present disclosure is not limited thereto. For example, the functions of the grid map generator 210, the candidate ground cell determination unit 220, the rho-direction profiling unit 230, the theta-direction filter 240, and the ground point detector 250 may be integrated or separated, and may be implemented as a series of instructions included in one program.

The grid map generator 210 may receive the point data from the lidar sensor 20. The point data received by the grid map generator 210 may include a plurality of points.

Further, the grid map generator 210 may generate a circular grid map and divide the circular grid map into a plurality of cells. Then, the grid map generator 210 arranges the plurality of points of the received point data in the plurality of cells.

Figure 3:
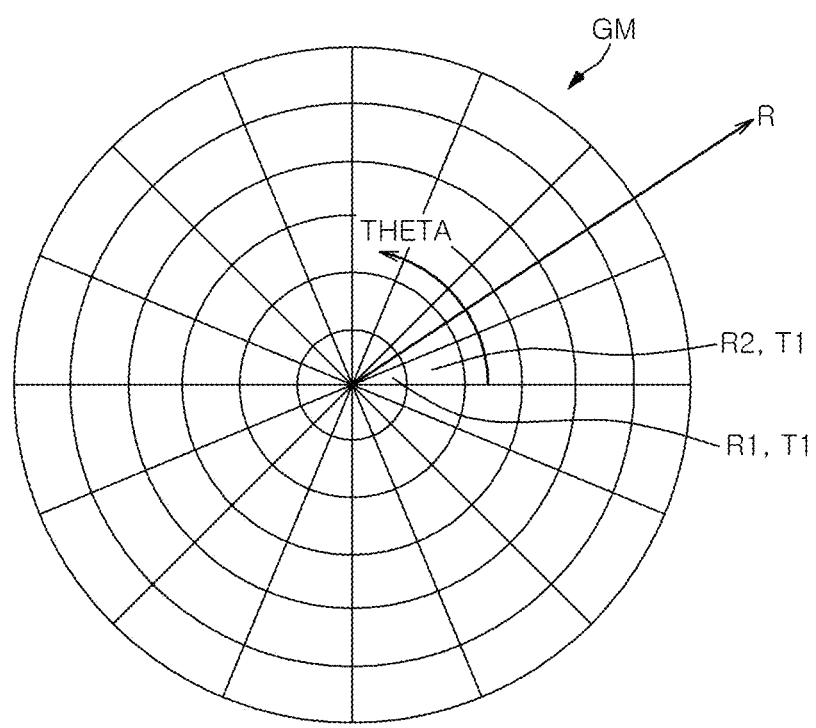
FIG. 3 illustrates an example of a circular grid map according to the embodiment of the present disclosure.

FIG. 3 illustrates an example of the circular grid map according to the embodiment of the present disclosure. For example, the plurality of cells included in the circular grid map GM may be represented by a polar coordinate system, that is, by radius components (radial coordinate) R in rho-directions and angular components (angular coordinate) T in the theta-direction.

Here, the radius component R indicates a distance (a magnitude of a radius) from the center (i.e., pole) of the circular grid map GM and the angular component T indicates a magnitude of an angle measured in a counterclockwise direction from 0 degrees of the circular grid map GM on the positive x-axis in the Cartesian coordinate system.

For example, the coordinates of a cell that is the first section in the rho-direction and the first section in the theta-direction with reference to the origin (0 degrees) of the circular grid map GM may be denoted by (R1, T1) and the coordinates of a cell that is the second section in the rho-direction and the first section in the theta-direction with reference to the origin (0 degrees) of the circular grid map GM may be denoted by (R2, T1).

In one embodiment, the circular grid map GM may be generated while positioning the lidar sensor 20 at the origin (center) thereof or while positioning the ground detection device 100 at the origin (center) thereof. However, the present disclosure is not limited thereto.

The candidate ground cell determination unit 220 may determine at least one candidate ground cell (a candidate cell that may include a ground surface) from among the plurality of cells using the height of at least one point arranged in each of the plurality of cells.

More specifically, the candidate ground cell determination unit 220 may determine, among the plurality of cells, a cell in which a height difference between the highest point (the point having the greatest height) and the lowest point (the point having the smallest height) among points arranged in the cell is less than a predetermined value as a candidate ground cell.

Figure 4:
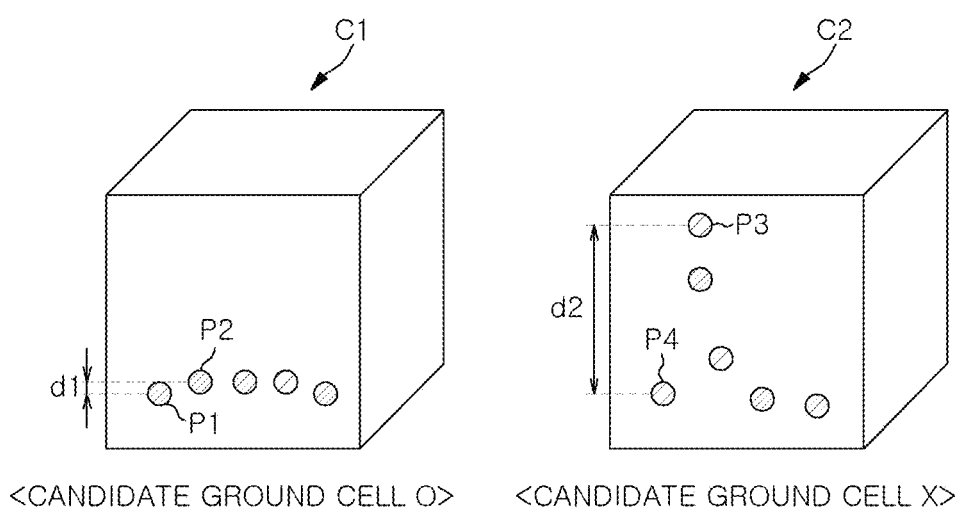
FIG. 4 illustrates an example of determining candidate ground cells according to the embodiment of the present disclosure.

FIG. 4 illustrates an example of determining a candidate ground cell according to the embodiment of the present disclosure.

For example, a height difference d1 between the highest point P1 and the lowest point P2 among points arranged in a first cell C1 is less than a predetermined value. Thus, the first cell C1 may be determined as a candidate ground cell. On the other hand, a height difference d2 between the highest point P3 and the lowest point P4 among points arranged in the second cell C2 exceeds the predetermined value. Thus, a second cell C2 is not determined as the candidate ground cell.

The rho-direction profiling unit 230 may generate a profile in the rho-direction using candidate ground cells.

To this end, the rho-direction profiling unit 230 may first determine valid ground cells (cell that is determined to include a ground surface) from among the candidate ground cells based on heights of points arranged in the candidate ground cells in the rho-direction.

More specifically, among candidate ground cells having different radius components in the rho-direction while having the same angular component in the theta-direction, the rho-direction profiling unit 230 may compare a minimum height value of a current candidate ground cell with a minimum height value of a previous candidate ground cell to determine whether or not the current candidate ground cell can be the valid ground cell.

When a difference between the minimum height value of the current candidate ground cell and the minimum height value of the previous candidate ground cell is less than the predetermined value, the rho-direction profiling unit 230 may set the current candidate ground cell as the valid ground cell.

Here, the current candidate ground cell is a current target for determining whether or not it is the valid ground cell. The previous candidate ground cell is a candidate ground cell positioned immediately before the current candidate ground cell (the current target) in the rho-direction among the candidate ground cells having the same angular component and the different radius components (That is, the previous candidate ground cell is positioned closer to the origin (0 degrees) of the circular grid map in the rho-direction as compared to the current candidate ground cell. The minimum height value may be the height of the lowest point among points arranged in each candidate ground cell.

A candidate ground cell having the smallest radius component value among the candidate ground cells having the same angular component indicates a candidate ground cell that is positioned closest to the driving vehicle having the ground detection device 100, and this candidate ground cell can be determined as a ground cell that is highly likely to be the valid ground cell.

Accordingly, on the basis of the candidate ground cell having the smallest radius component value among the candidate ground cells, it is possible to determine whether a candidate ground cell having the second smallest radius component value is the valid ground cell. Further, on the basis of the candidate ground cell that is the valid ground cell having the second smallest radius component value, it is possible to determine whether a candidate ground cell having the third smallest radius component value is the valid ground cell. The same process is repeated for the rest of the candidate ground cells having the same angular component to determine whether they are the valid ground cell.

Here, the reason why determining whether the candidate ground cells are the valid ground cell is not performed only on the basis of the candidate ground cell having the smallest radius component value among the candidate ground cells is to detect a slanted ground as well as a flat ground.

Figure 5:
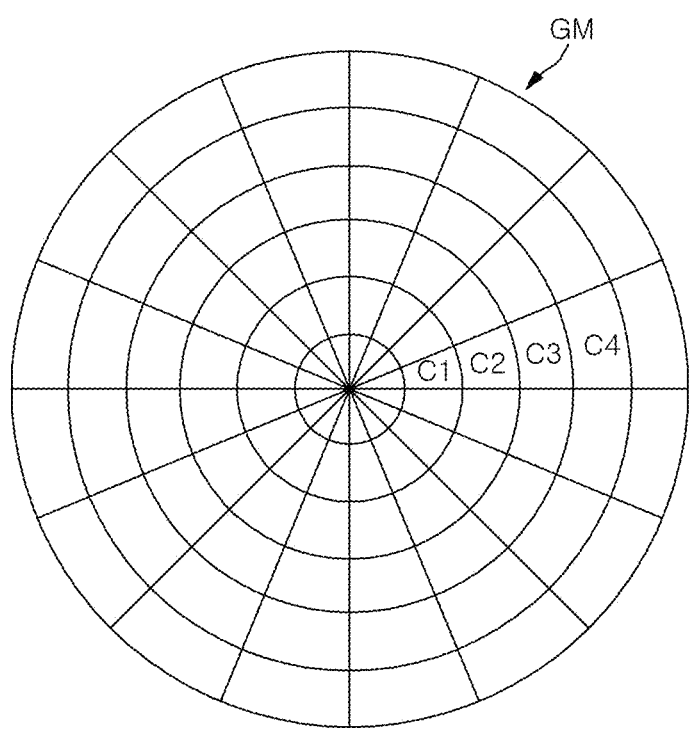
FIG. 5 illustrates an example of a method of determining a valid ground cell by a rho-direction profiling unit among the candidate ground cells according to the embodiment of the present disclosure.

For example, as shown in FIG. 5, if it is determined that, among a first cell C1, a second cell C2, a third cell C3, and a fourth cell C4 having the same angular component, the first cell C1, the third cell C3, and the fourth cell C4 are candidate ground cells, the rho-direction profiling unit 230 may determine the first cell C1 as the valid ground cell, determine the third cell C3 as the valid ground cell if a difference between the minimum height value of the first cell C1 and the minimum height value of the third cell C3 is less than a predetermined value, and determine the fourth cell C4 as an invalid ground cell if a difference between the minimum height value of the third cell C3 and the minimum height value of the fourth cell C4 is equal to or greater than the predetermined value.

Further, the rho-direction profiling unit 230 may perform ground profiling in the specific rho-direction based on heights of points arranged in the respective valid ground cells having the same angular component and generate rho-direction profile values of the ground cells having the same angular component.

More specifically, the rho-direction profiling unit 230 may perform the ground profiling in the specific rho-direction using the minimum height values of the respective valid ground cells having the same angular component to generate a fitting function in the corresponding rho-direction. Here, the fitting function may be a function that outputs the minimum height value of a specific cell as a rho-direction profile value when a radius component value of the specific cell is input thereto.

That is, the rho-direction profiling unit 230 may perform a line fitting on the minimum height values of the valid ground cells having the same angular component value of T1 to generate a fitting function for T1 (i.e., in the direction of the theta T1). Then, the rho-direction profiling unit 230 may input radius component values of the cells having the angular component value of T1 to the fitting function, so that rho-direction profile values of the cells having the same angular component can be generated.

In one embodiment, the rho-direction profiling unit 230 may generate the fitting function as a ground profile in the rho-direction using a random sample consensus (RANSAC) algorithm. Accordingly, outliers are removed among the minimum height values of the valid ground cells and the fitting function composed of only inliers may be generated. Therefore, the accuracy of the ground profile in the rho-direction can be improved.

Figure 6:
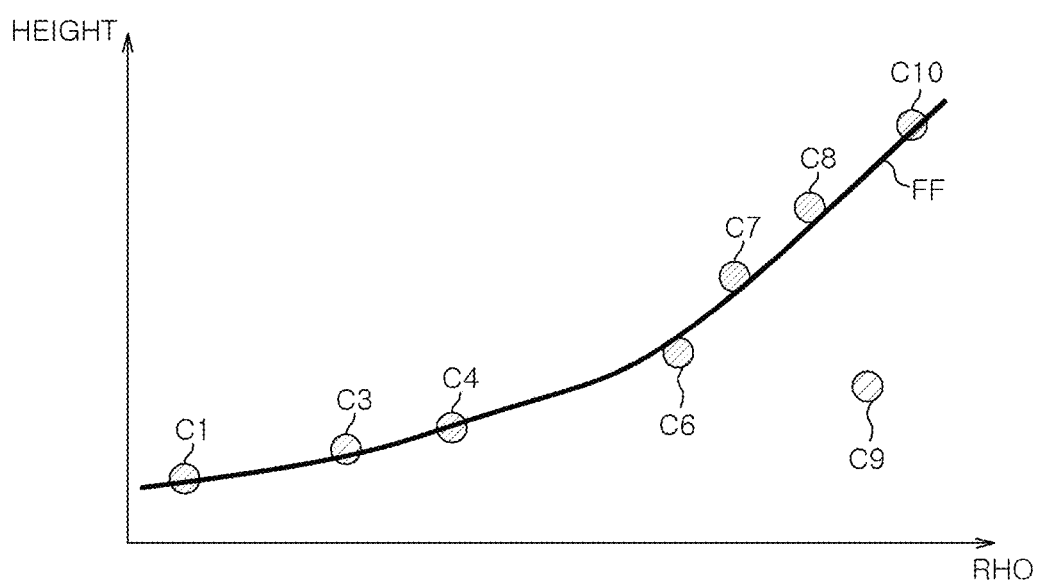
FIG. 6 illustrates an example of a fitting function generated by the rho-direction profiling unit according to the embodiment of the present disclosure.

Referring to FIG. 6, for example, the rho-direction profiling unit 230 may generate a fitting function FF by performing a line fitting process using the minimum height values of valid ground cells C1, C3, C4, and C6 to C10 having the same angular component. Here, the minimum height value of a ground cell C9 that does not fit the fitting function and corresponds to an outlier and thus may not be used to generate the fitting function FF.

As shown in FIG. 6, the rho-direction profile values that can be obtained from the fitting function FF (that is, the line-fitted minimum height values of the valid ground cells) may be different from the actual minimum height values of the valid ground cells. This may correspond to error generated in a case where the line fitting process is performed using the actual minimum height values of the valid ground cells.

Furthermore, since the fitting function FF is generated in a continuous form, the fitting function FF may also provide a rho-direction profile value of a cell that is not the valid ground cell among the cells having the angular component of T1.

Accordingly, when the rho-direction profiling unit 230 performs ground profiling in the rho-directions for all angular components, rho-direction profile values for all cells can be generated irrespective of whether the cells are valid ground cells.

Thereafter, the theta-direction filter 240 may filter the rho-direction profile values generated by the rho-direction profiling unit 230 in the theta-direction in order to improve the stability of the rho-direction profile values.

Specifically, for a certain cell (hereinafter referred to as a filtering target cell) among the plurality of cells, the theta-direction filter 240 may calculate an average of rho-direction profile values of N number of cells that are adjacent to the filtering target cell and have the same radius component as that of the filtering target cell. Then, the theta-direction filter 240 determine the average as a final profile value of the filtering target cell.

When calculating the average, the theta-direction filter 240 may exclude, from the N number of cells adjacent to the filtering target cell where N is an integer equal to or greater than 1, a cell having a rho-direction profile value different from the rho-direction profile value of the filtering target cell by a predetermined reference value or more. This is for the purpose of accurately detecting a ground even in a case in which there is a considerable height difference in the theta-direction, such as the case of an entrance to an overpass or an underpass.

That is, the theta-direction filter 240 may calculate the average of the rho-direction profile values of the N of cells adjacent to the filtering target cell using the following equation 1:

$$FH_{(R,T)} = \frac{1}{N}\sum_{i=1}^{N} H_{(R,T_i)}, \text{ (when } |H_{(R,T)} - H_{(R,Ti)}| < th) \quad \text{(Equation 1)}$$

where $FH_{(R,T)}$ represents a final profile value of a cell (e.g., the filtering target cell) having a radius component value R and an angular component value T, N represents the number of cells adjacent to the filtering target cell used to generate the final profile value, $H_{(R,Ti)}$ represents a rho-direction profile value of an adjacent cell having the radius component value R and an angular component value $T_i$, $H_{(R,T)}$ represents the rho-direction profile value of the cell (e.g., the filtering target cell) having the radius component value R and the angular component value T, and th represents the predetermined reference value (threshold).

Figure 7A:
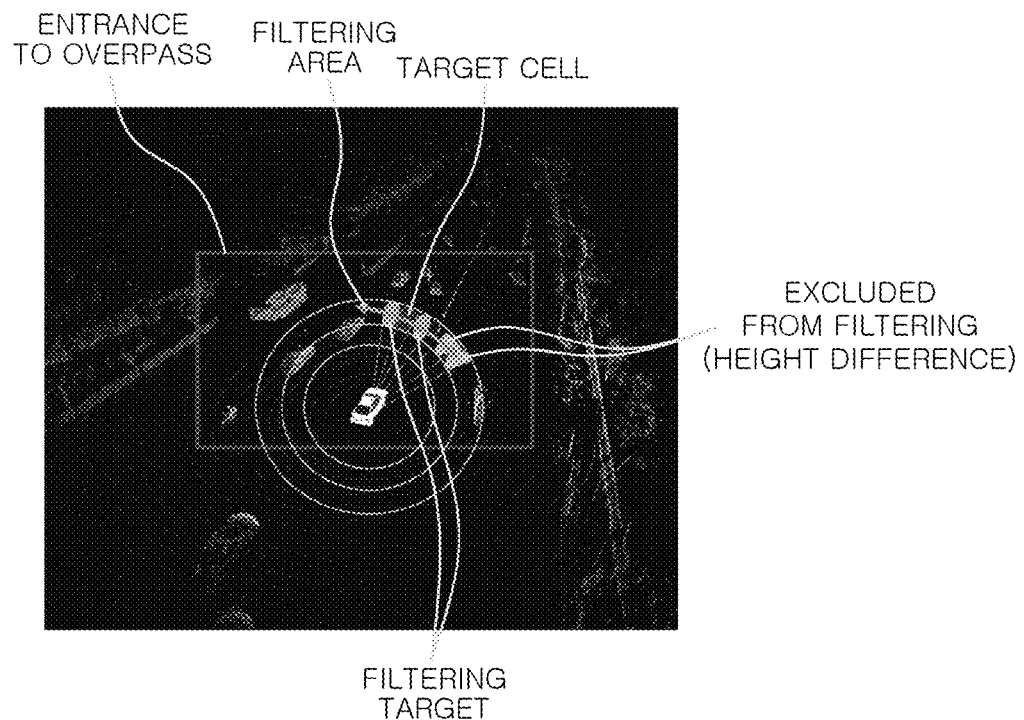
FIG. 7A illustrates an example of filtering rho-direction profile values in a theta-direction by a theta-direction filter according to the embodiment of the present disclosure.
Figure 7B:
FIG. 7B illustrates another example of filtering rho-direction profile values in a theta-direction by a theta-direction filter according to the embodiment of the present disclosure.

FIG. 7A illustrates an example in which the ground detection device 100 installed in the driving vehicle performs the filtering on cells having the same radius component in the theta-direction and FIG. 7B illustrates an example in which the ground detection device 100 installed in the driving vehicle performs the filtering on the cells having the same radius component in the theta-direction to detect a height difference of the ground at an entrance to an overpass.

As shown in FIG. 7, the theta-direction filter 240 excludes, from the N number of cells adjacent to the filtering target cell, a cell having a rho-direction profile value different from the rho-direction profile value of the filtering target cell by the predetermined reference value or more when calculating the average of the rho-direction profile values of the adjacent cells. Therefore, the ground detection device 100 can accurately detect even a ground having a considerable height difference in the theta-direction, such as then entrance to the overpass or the underpass.

The ground point detector 250 may detect ground points for each of the plurality of cells based on the final profile values of the plurality of cells.

Specifically, the ground point detector 250 may detect, among points arranged in each of the plurality of cells, points having height values within a predetermined range from the final profile value of the corresponding cell and determine the detected points as ground points.

The ground point detector 250 may classify and process points other than the ground points among the points arranged in the plurality of cells as object points.

Figure 8:
FIG. 8 illustrates an example of object points that are obtained after ground points are excluded from points obtained as a result of a ground point detection by a ground point detector.

FIG. 8 illustrates an example of the object points that are obtained after the ground points are excluded from the points obtained as a result of the ground point detection by the ground point detector 250.

That is, the ground point detector 250 detects only the ground points among the points arranged in the plurality of cells, and thus the ground detection device 100 can classify the object points that do not correspond to the ground more accurately.

Figure 9:
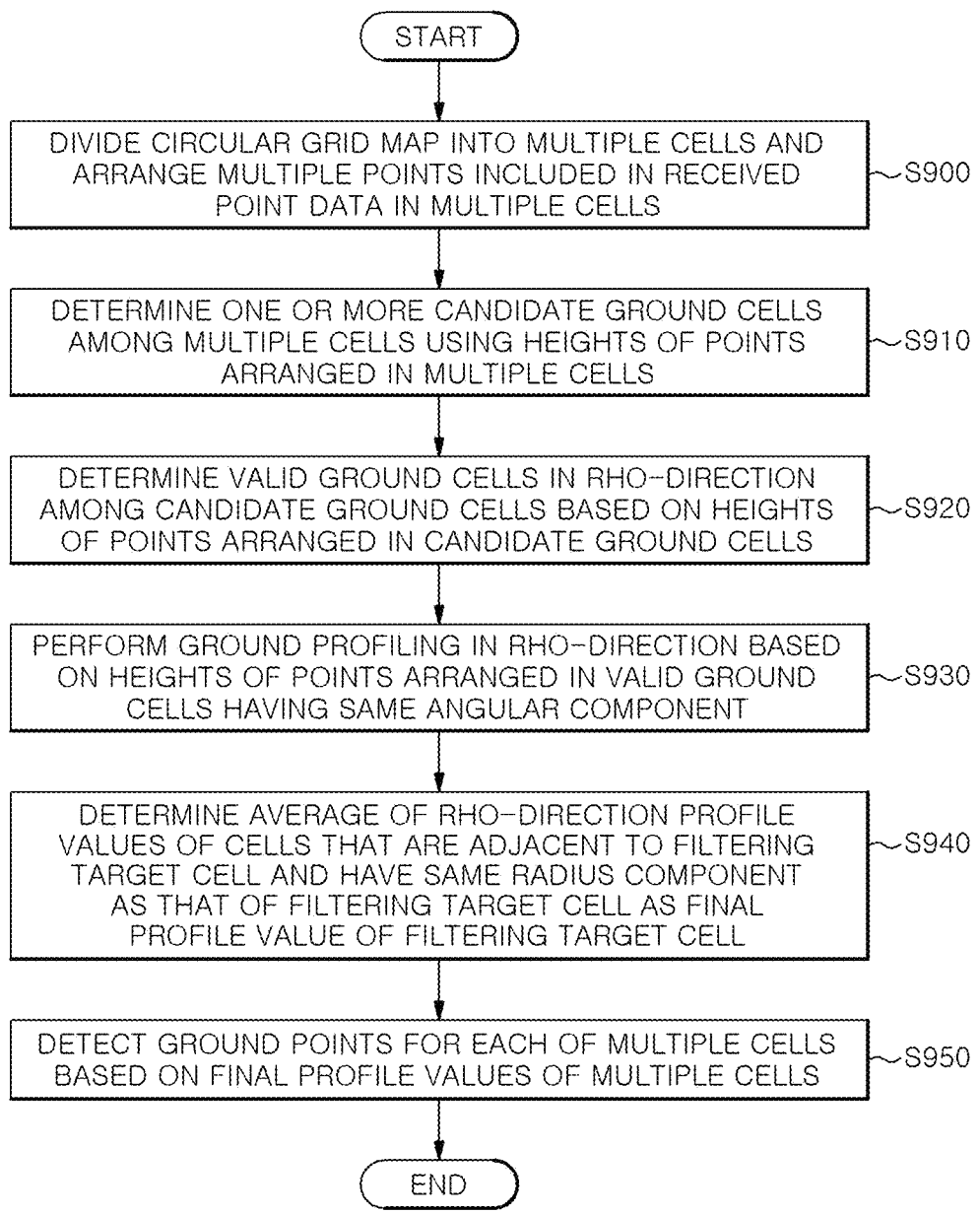
FIG. 9 is a flowchart illustrating a method for detecting a ground by the ground detection device according to the embodiment of the present disclosure.

FIG. 9 is a flowchart illustrating a method for detecting a ground by the ground detection device according to the embodiment of the present disclosure.

Referring to FIG. 1, FIG. 2, and FIG. 9, the grid map generator 210 may divide a generated circular grid map into a plurality of cells and arrange a plurality of points included in received point data in the plurality of cells (step S900).

The candidate ground cell determination unit 220 may determine one or more candidate ground cells among the plurality of cells using heights of the points arranged in the plurality of cells (step S910).

The rho-direction profiling unit 230 may determine valid ground cells in the rho-direction among the candidate ground cells based on heights of points arranged in the candidate ground cells (step S920) and perform ground profiling in the rho-direction based on heights of points arranged in the valid ground cells having the same angular component (step S930).

Thereafter, the theta-direction filter 240 may calculate an average of rho-direction profile values of cells that are adjacent to a filtering target cell and have the same radius component as that of the filtering target cell and determine the average as a final profile value of the filtering target cell (step S940).

Finally, the ground point detector 250 may detect ground points for each of the plurality of cells based on final profile values of the plurality of cells (step S950).

According to the embodiments of the present disclosure, it is possible to divide a circular grid map into a plurality of cells and detect the ground of a road. Therefore, it is possible to detect the ground rapidly and efficiently.

Furthermore, according to the embodiments of the present disclosure, it is possible to accurately detect various curves on roads, entrances to overpasses and underpasses, and exits from the overpasses and the underpasses by performing the ground profiling in the rho-direction and performing the profile filtering in the theta-direction.

Moreover, according to the embodiments of the present disclosure, a ground can be detected irrespective of a lidar sensor type and thus system applicability can be improved.

The combinations of respective blocks of block diagrams and respective sequences of a flow diagram attached herein is carried out by computer program instructions which are executed through various computer means and recorded in a non-transitory computer-readable recording medium. Since the computer program instructions is loaded in processors of a general purpose computer, a special purpose computer, or other programmable data processing apparatus, the instructions, carried out by the processor of the computer or other programmable data processing apparatus, create means for performing functions described in the respective blocks of the block diagrams or in the respective sequences of the sequence diagram. Since the computer program instructions, in order to implement functions in specific manner, is stored in a memory unit, which comprises non-transitory computer-readable medium, useable or readable by a computer or a computer aiming for other programmable data processing apparatus, the instruction stored in the memory unit useable or readable by a computer produces manufacturing items including an instruction means for performing functions described in the respective blocks of the block diagrams and in the respective sequences of the sequence diagram. Since the computer program instructions are loaded in a computer or other programmable data processing apparatus, instructions, a series of sequences of which is executed in a computer or other programmable data processing apparatus to create processes executed by a computer to operate a computer or other programmable data processing apparatus, provides operations for executing functions described in the respective blocks of the block diagrams and the respective sequences of the flow diagram. The computer program instructions are also performed by one or more processes or specifically configured hardware (e.g., by one or more application specific integrated circuits or ASIC(s)). The non-transitory computer-readable recording medium includes, for example, a program command, a data file, a data structure and the like solely or in a combined manner. The program command recorded in the medium is a program command specially designed and configured for the present disclosure or a program command known to be used by those skilled in the art of the computer software. The non-transitory computer-readable recording medium includes, for example, magnetic media, such as a hard disk, a floppy disk and a magnetic tape, optical media, such as a CD-ROM and a DVD, magneto-optical media, such as a floptical disk, and hardware devices specially configured to store and execute program commands, such as a ROM, a RAM, a flash memory and the like. The program command includes, for example, high-level language codes that can be executed by a computer using an interpreter or the like, as well as a machine code generated by a compiler. The hardware devices can be configured to operate using one or more software modules in order to perform the operation of the present disclosure, and vice versa. In some embodiments, one or more of the processes or functionality described herein is/are performed by specifically configured hardware (e.g., by one or more application specific integrated circuits or ASIC(s)). Some embodiments incorporate more than one of the described processes in a single ASIC. In some embodiments, one or more of the processes or functionality described herein is/are performed by at least one processor which is programmed for performing such processes or functionality.

Moreover, the respective blocks or the respective sequences in the appended drawings indicate some of modules, segments, or codes including at least one executable instruction for executing a specific logical function(s). In several alternative embodiments, it is noted that the functions described in the blocks or the sequences run out of order. For example, two consecutive blocks and sequences are substantially executed simultaneously or often in reverse order according to corresponding functions.

The explanation as set forth above is merely described a technical idea of the exemplary embodiments of the present disclosure, and it will be understood by those skilled in the art to which this disclosure belongs that various changes and modifications is made without departing from the scope and spirit of the claimed invention as disclosed in the accompanying claims. Therefore, the exemplary embodiments disclosed herein are not used to limit the technical idea of the present disclosure, but to explain the present disclosure. The scope of the claimed invention is to be determined by not only the following claims but also their equivalents. Specific terms used in this disclosure and drawings are used for illustrative purposes and not to be considered as limitations of the present disclosure. Therefore, the scope of the claimed invention is construed as defined in the following claims and changes, modifications and equivalents that fall within the technical idea of the present disclosure are intended to be embraced by the scope of the claimed invention.

What is claimed is:

1. A method for detecting a ground using a ground detection device, the method comprising:
   arranging points obtained from a lidar sensor in a plurality of cells included in a circular grid map;
   generating a profile value for each of the plurality of cells using heights of the points; and
   detecting ground points arranged in each of the plurality of cells using the profile values,
   wherein the generating of the profile value for each of the plurality of cells comprises:
   determining one or more candidate ground cells among the plurality of cells using the heights of the points; and
   generating the profile value for each of the plurality of cells using the heights of the points arranged in the one or more candidate ground cells,
   wherein the profile value is generated based on valid ground cell, and
   wherein the valid ground cell is determined based on a height difference between a height of a first point having a smallest height arranged in a first candidate ground cell among the one or more candidate ground cells having a same angular component, and a height of a second point having a smallest height arranged in a second candidate ground cell positioned before the first candidate ground cell in a rho-direction of the circular grid map.

2. The method of claim 1, wherein the determining of the one or more candidate ground cells comprises:
   comparing a height difference between a first point having the greatest height and a second point having the smallest height among the points arranged in each of the plurality of cells; and
   determining the one or more candidate ground cells based on a result of the comparing.

3. The method of claim 1, wherein the generating of the profile value for each of the plurality of cells comprises:
   extracting candidate ground cells having the same angular component from the one or more candidate ground cells;
   determining, among the candidate ground cells having the same angular component, the first candidate ground cell as the valid ground cell when the height difference between the first point having the smallest height arranged in the first candidate ground cell and the second point having the smallest height arranged in the second candidate ground cell positioned before the first candidate ground cell in the rho-direction of the circular grid map is less than a predetermined value; and
   generating one or more valid ground cells as a result of the determining.

4. The method of claim 3, wherein the generating of the profile value for each of the plurality of cells further comprises:
   generating a line fitting function for valid ground cells having the same angular component, among the determined one or more valid ground cells, using the heights of the points arranged in the valid ground cells having the same angular component.

5. The method of claim 4, wherein the line fitting function represents a height per each radius component of the circular grid map.

6. The method of claim 4, wherein the generating of the profile value for each of the plurality of cells further comprises:
   generating a first profile value of a first cell among the plurality of cells using the line fitting function; and
   determining, as a final profile value of the first cell, an average of second profile values of N number of second cells that are adjacent to the first cell and have a same radius component with a radius component of the first cell where N is an integer equal to or greater than 1.

7. The method of claim 6, wherein the determining of the final profile value of the first cell comprises:
   determining the average of the second profile values after excluding a third cell having a profile value different from the first profile value by a predetermined reference value or more among the N number of second cells.

8. The method of claim 6, wherein the detecting of the ground points comprises:
   detecting points having heights within a predetermined range from the final profile value among the points arranged in the first cell as the ground points.

9. A ground detection system, comprising:
   a lidar sensor to obtain point data therearound; and
   a ground detection device to detect a ground, the ground detection device including:
   a transceiver to obtain, from the lidar sensor, the point data around the lidar sensor; and
   a processor to control the transceiver,
   wherein the processor is configured to:
   arrange the point data in a plurality of cells included in a circular grid map;
   determine one or more candidate ground cells among the plurality of cells using heights of points arranged in the plurality of cells;
   generate a profile value for each of the plurality of cells using the heights of the points arranged in the one or more candidate ground cells; and
   detect ground points arranged in each of the plurality of cells using the profile value,
   wherein the processor is further configured to:
   determine the one or more candidate ground cells among the plurality of cells using the heights of the points; and
   generate the profile value for each of the plurality of cells using the heights of the points arranged in the one or more candidate ground cells,
   wherein the profile value is generated based on valid ground cell, and
   wherein the valid ground cell is determined based on a height difference between a height of a first point having a smallest height arranged in a first candidate ground cell among the one or more candidate ground cells having a same angular component, and a height of a second point having a smallest height arranged in a second candidate ground cell positioned before the first candidate ground cell in a rho-direction of the circular grid map.

10. A non-transitory computer-readable storage medium storing computer-executable instructions which cause, when executed by a processor, the processor to perform a method for detecting a ground that is performed by a ground detection device, the method comprising:
    arranging points obtained from a lidar sensor in a plurality of cells included in a circular grid map;
    generating a profile value for each of the plurality of cells using heights of the points; and
    detecting ground points arranged in each of the plurality of cells using the profile values,
    wherein the generating the profile value for each of the plurality of cells includes:
    determining one or more candidate ground cells among the plurality of cells using the heights of the points; and
    generating the profile value for each of the plurality of cells using the heights of the points arranged in the one or more candidate ground cells,
    wherein the profile value is generated based on valid ground cell, and
    wherein the valid ground cell is determined based on a height difference between a height of a first point having a smallest height arranged in a first candidate ground cell among the one or more candidate ground cells having a same angular component, and a height of a second point having a smallest height arranged in a second candidate ground cell positioned before the first candidate ground cell in a rho-direction of the circular grid map.

11. The non-transitory computer-readable storage medium of claim 10, wherein the determining of the one or more candidate ground cells comprises:
    comparing a height difference between a first point having the greatest height and a second point having the smallest height among the points arranged in each of the plurality of cells; and
    determining the one or more candidate ground cells based on a result of the comparing.

12. The non-transitory computer-readable storage medium of claim 10, wherein the generating of the profile value for each of the plurality of cells comprises:
    extracting candidate ground cells having the same angular component from the one or more candidate ground cells;
    among the candidate ground cells having the same angular component, determining the first candidate ground cell as the valid ground cell when the height difference between the first point having the smallest height arranged in the first candidate ground cell and the second point having the smallest height arranged in the second candidate ground cell positioned before the first candidate ground cell in the rho-direction of the circular grid map is less than a predetermined value; and
    generating one or more valid ground cells as a result of the determining.

13. The non-transitory computer-readable storage medium of claim 12, wherein the generating of the profile value for each of the plurality of cells further comprises:
    generating a line fitting function for valid ground cells having the same angular component, among the determined one or more valid ground cells, using the heights of the points arranged in the valid ground cells having the same angular component.

14. The non-transitory computer-readable storage medium of claim 13, wherein the line fitting function represents a height per each radius component of the circular grid map.

15. The non-transitory computer-readable storage medium of claim 13, wherein the generating of the profile value for each of the plurality of cells further comprises:
    generating a first profile value of a first cell among the plurality of cells using the line fitting function; and
    determining, as a final profile value of the first cell, an average of second profile values of N number of second cells that are adjacent to the first cell and have a same radius component with a radius component of the first cell where N is an integer equal to or greater than 1.

16. The non-transitory computer-readable storage medium of claim 15, wherein the determining of the final profile value of the first cell comprises:

determining the average of the second profile values after excluding a third cell having a profile value different from the first profile value by a predetermined reference value or more among the N number of second cells.

17. The non-transitory computer-readable storage medium of claim 15, wherein the detecting of the ground points comprises:

detecting points having heights within a predetermined range from the final profile value among the points arranged in the first cell as the ground points.

* * * * *